June 14, 1949.  J. N. CANDLER  2,473,329
TAIL ROTOR FOR HELICOPTERS
Filed Dec. 15, 1944  2 Sheets-Sheet 1
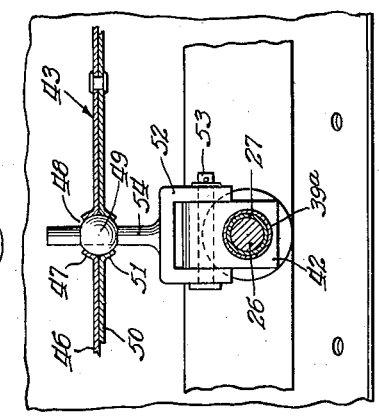
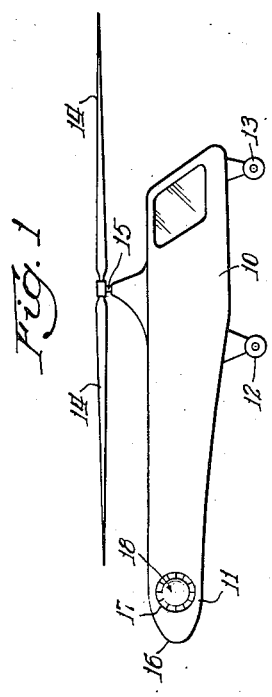
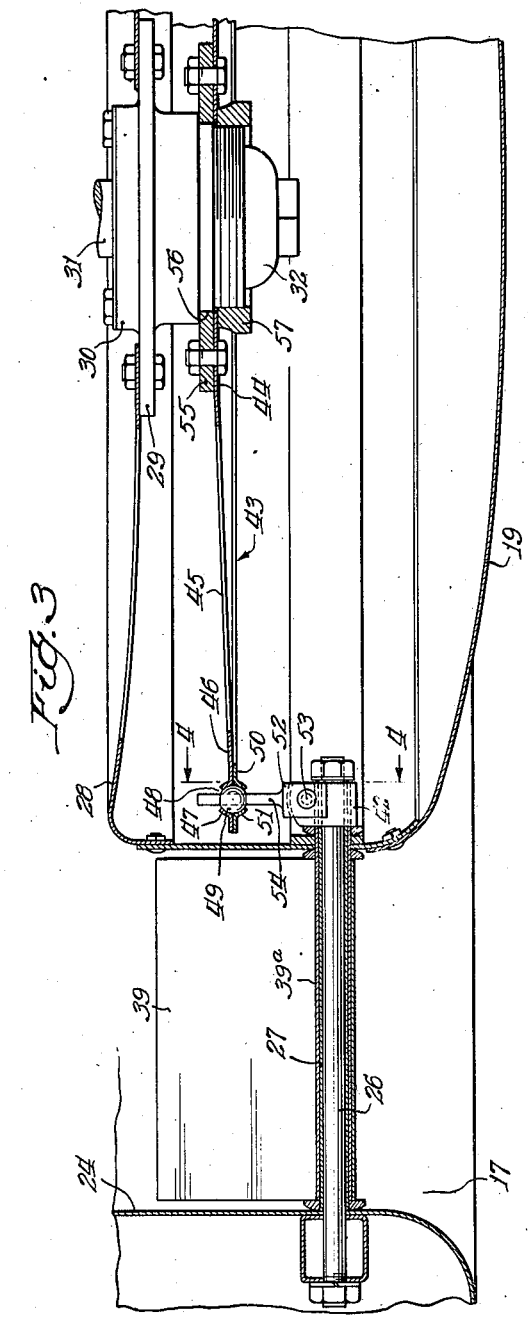
Inventor:
J. Natt Candler June 14, 1949. J. N. CANDLER 2,473,329
TAIL ROTOR FOR HELICOPTERS
Filed Dec. 15, 1944 2 Sheets-Sheet 2
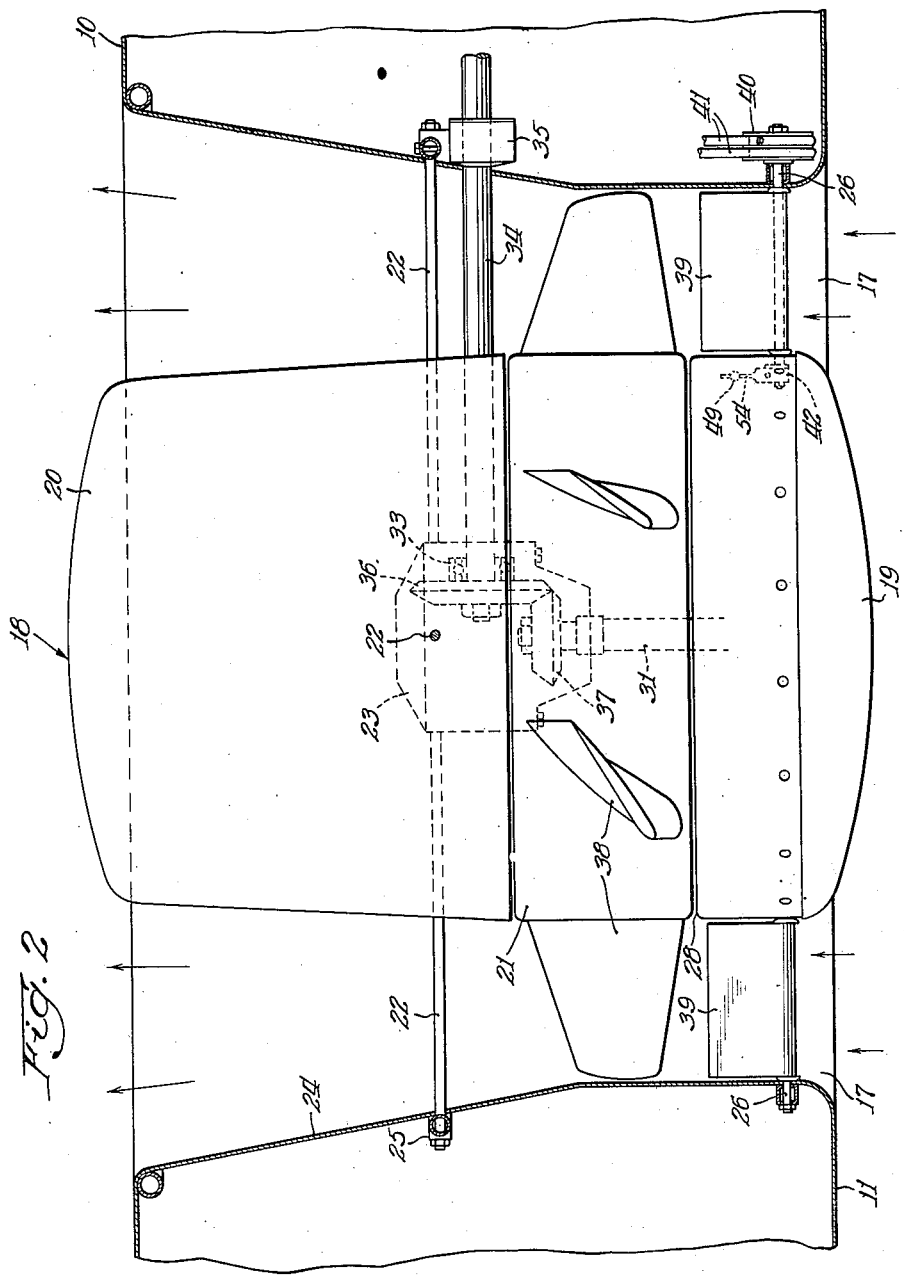
Inventor:
J. Nall Candler
By Edward C Fitzhaugh
Atty Patented June 14, 1949

2,473,329

UNITED STATES PATENT OFFICE 2,473,329

TAIL ROTOR FOR HELICOPTERS

James Nall Candler, Grosse Pointe, Mich., assignor to Borg-Warner Corporation, Chicago, Ill., a corporation of Illinois Application December 15, 1944, Serial No. 568,293

4 Claims. (Cl. 230—114)

The present invention relates to devices for controlling the torque developed in the fuselage of an aircraft by the propeller, such torque being especially noticeable in aircraft of the helicopter type that usually employs a horizontal propeller rotating on a vertical axis above the body. It will be understood, however, that while the improvement has been herein disclosed in a helicopter, the principles involved are also adapted for use in other types of aircraft.

Heretofore it has been the usual practice to counteract or control the torque developed in the aircraft fuselage by means of an axial bladed impeller or rotor mounted on a horizontal shaft and operating on one side or the other in ambient air at the tail of the fuselage. Arrangements of this character are more or less efficient, but they present inherent objections. For example, the blades or air foils are usually of such large diameter that they project above and below the tail portion of the fuselage thereby presenting considerable sail area that is undesirably influenced by sudden gusts of air blowing from the opposite side of the fuselage. Furthermore, such tail rotors being alongside the fuselage and exterior thereto tend to interrupt the streamline effect of the aircraft body. Also such arrangements are extremely hazardous to persons close to the tail of the helicopter when the aircraft is approaching or on the ground.

The present improvements provide a torque control bladed impeller that is arranged within the confines of the fuselage tail portion where it is shrouded by the fuselage walls and is adapted to create an air current that is effective upon the ambient air at the side of the aircraft. The improvements are especially applicable for opposing the torque developed in the fuselage of a helicopter, by an overhead propeller that rotates on a vertical axis. Also provision is made for controlling this air current by means of adjustable swinging louvers that have fixed axes and which do not rotate with the bladed impeller. This arrangement eliminates the size and weight, and materially simplifies the complicated mechanism usually employed for changing the pitch of the blades of a tail rotor.

It is one of the principal objects of this invention to simplify the construction of an aircraft torque control such as contemplated herein, and to improve the efficiency, operation and dependability of such torque control.

Another principal object of this invention is to provide torque control means that comprises an axial flow impeller located within the fuselage of an aircraft for creating an air current transverse to the direction of flight and to regulate in a predetermined manner the direction and the quantity of air reaching the impeller blades.

A further principal object resides in providing simple but effective means for adjusting the angularity of a plurality of louvers thereby controlling the flow of air to a torque control impeller within the aircraft fuselage.

Still another object is to provide an adjustable supporting device for the air current regulating louvers, said supporting device being preferably mounted upon the shaft which actuates the axial flow air foils of the torque control.

A still further object is to provide the spindles of the flow control louvers with rocker arms that have an articulated connection, such as a universal joint or ball and socket coupling, with a rotary reciprocable annulus or ring device that constitutes a common means for simultaneously moving the plurality of louver. The louvers in this assembly are arranged in an annular row at the inlet end of a cylindrical air passageway extending transversely through the fuselage.

Additional objects, aims and advantages of the present invention will be apparent to persons skilled in the art after the construction and operation of the torque control device is understood from the within description.

It is preferred to accomplish the numerous objects of this invention, and to practice the same, in substantially the manner hereinafter fully described and as more particularly pointed out in the appended claims, reference being made to the accompanying drawings that form a part of this specification.

Fig. 1 is a longitudinal side elevation of an aircraft showing thereon the instrumentalities of the present torque control;

Fig. 2 is a top plan of the torque control assembly with adjacent portions of the fuselage broken away;

Fig. 3 is a horizontal axial section of the arrangement for operating the air current directing louvers of the present invention; and Fig. 4 is a sectional view partly fragmentary showing details of the louver adjusting devices.

Drawings are to be understood as being more or less of a schematic character for the purpose of disclosing a typical or preferred form of the improvements contemplated herein. In these drawings like reference characters identify the same parts in the different views.

The helicopter shown in Fig. 1 is merely typical of an aircraft wherein the present invention is adapted to be incorporated. The aircraft shown comprises a forward body portion 10 that terminates at its rear in an elongated trailing tail portion 11, and below the body portion there is a landing wheel or gear 12 and a nose wheel 13. For driving or controlling the helicopter a horizontal main propeller or rotor is employed that comprises radial air foils 14 having universal pitch control and connected to the upper portion of a vertical drive shaft 15 that extends down inside the body portion 10 and is driven by a suitable motor (not shown). The rotation of the air foils or blades 14 tends to cause the helicopter body to rotate in a direction opposite to the rotor axis or shaft 15, such rotation being due to the torque that is created by the impeller upon the body of the helicopter. Heretofore this torque, as hereinbefore explained, has been counterbalanced or opposed by means of an exterior rotor mounted on a horizontal axis at a side of the helicopter tail. In the present instance the torque control is an arrangement disposed within the body of the helicopter adjacent the tail where it is enshrouded by the walls of the aircraft and is adapted to drive a current of air laterally through the helicopter body or tail portion, so that the air current impinges upon ambient air thereby overcoming or counterbalancing the torque which has been created by the main rotor or propeller blades 14.

By reference to Fig. 1 it will be seen that the aft portion of the tail 11 is somewhat lobe-shaped as at 16 and within this rear end of the tail there is a funnel shaped transverse opening 17 that extends through the side walls of the helicopter. As seen in Fig. 2 the central or axial portion of the opening is closed by a drum-like housing identified generally as 18 and comprises stationary outer or side sections 19 and 20 the former being cylindrical and the latter tapered outward as shown in Fig. 2, and there is a rotatable intermediate section 21 of cylindrical cross section intermediate the outer sections. The stationary section 20 which is shown on the port side of the aircraft extends farther into the opening than the starboard section 19, and the latter section 19 is intimately associated with and encompasses the mechanism which operates suitable control louvers for regulating the direction and the quantity of air driven through the opening by the rotating impeller section 21. The stationary sections 19 and 20 have outwardly bowed end walls as seen in Fig. 2 that conform generally to the stream-lined surface of the fuselage.

The section 20 is supported in the center of the opening 17 by means of a plurality of stay rods 22 that are anchored to and project from a gear housing 23 inside the section 20. The outer portions of stay rods 22 pass through the cylindrical wall of the section 20 and enter the flared cylindrical wall 24 which defines the outer limit of the air passages 17 through the fuselage tail portion. Within flared wall 24 the ends of stay rods 22 are anchored to the frame rings 25 that brace the flared wall 24 and to which the stay rods are coupled in any suitable manner. The starboard section 19 of this housing assembly has its cylindrical wall connected to the passageway wall 24 by elongated radial spindles or bolts 26 that are telescoped within tubular spacers 27 extending between said walls and entering section 19. The inner portion of the housing section 19 is closed off by a circular or disk-shaped plate 28 that is adjacent the rotatable intermediate housing section 21 and has its central portion bolted or otherwise secured to a flange 29 projecting from an axially arranged collar 30.

The shaft 31 of the torque balancing impeller assembly also assists in supporting the adjacent stationary end housing 19 through the instrumentality of the collar 30. The collar 30 is somewhat cup-shaped and has internal threads to receive a terminal cap 32 that is screwed thereinto to secure suitable antifriction bearings against a shoulder or seat on the collar 30.

The gear housing or casing 23 is a hollow truncated casting into which the ends of the stay rods 22 are threaded or otherwise secured and said housing has a suitable bearing 33 for journalling the adjacent end of a drive shaft 34 for actuating the impeller section 21. The drive shaft projects through the cylindrical wall of the stationary section 20, then through the adjacent portion of the flared passageway wall 24 and into the fuselage where it is journalled in a bearing block 35. The shaft 34 extends forwardly in the fuselage for connection in any suitable manner to the motor which actuates the main propeller or air foils 14. Within the gear housing 23 the shaft 34 has a miter gear 36 anchored to it that meshes with a miter gear 37 upon the adjacent end of the relatively short impeller shaft 31. The impeller section 21 has a plurality of radially disposed fins or blades 38 of suitable cross-section projecting from the cylindrical surface of said impeller section which blades terminate close to the adjacent portion of the flared wall 24 defining the outer limits of the annular air passageway 17. Thus the blades 38 operate in this passageway adjacent the intake end thereof. As shown in Fig. 2 the circumferential walls of the housing sections 19, 20 and 21 together with flared concentric wall 24 surrounding and spaced from these housing sections form the annular opening or passage in which the torque control impeller blades move and in which the air directing vanes or louvers are disposed. It will also be observed that these walls diverge or flare away from each other toward the port side of the fuselage for producing a Venturi effect.

The louver devices comprise a plurality of metal blades 39 approximately rectangular in outline that have their bases anchored to tubes 39a on the spacers 27 in which the tie bolts 26 are disposed, and these blades are of such length that the louvers extend across the narrower portion of the annular opening 17 between the cylindrical fuselage wall 24 and the cylindrical wall of housing section 19. As shown in Figs. 2 and 3 one of the tubes 39a rotating around a spacer 27 and the corresponding tie bolt 26 projects far enough into the forward fuselage section to receive the actuator double pulley 40 about which the control cables 41 are trained. Sprockets and chains, or other suitable means may be employed in lieu of the pulleys and cables. These cables lead to the operator's cabin at the nose of the aircraft where they may be connected in any suitable manner to a control lever or handle to permit manipulation of the cables for changing the positions of the louver 39. This will regulate the direction and the quantity of air entering the annular passageway 17. The movement of the cables 41 in either direction will rock or rotate the pulley 40 thereby transmitting a movement bolt or spindle 26 upon which the pulley is secured.

All of the bolts 26 and spacers 27 project into the housing section 19 where they have blocks or knuckles 42 suitably anchored to their inner ends. Each block as shown in Fig. 4 is suitably connected to a rotary reciprocable spider identified generally as 43. This spider comprises a central portion 44, a plurality of radiating spokes 45, and an annular outer rim portion 46 that is adjacent the cylindrical wall of the housing section 19 and also close to the adjacent ends of the bolts 26. The annular rim 46 of this spider has a plurality of dimples 47 each of which has a central opening 48. These dimples provide concave seats to receive somewhat spherical or ball-shaped members 49 having transverse bores and which are maintained in position in these seats by means of the retainer ring 50 which is also provided with apertured dimples 51 arranged oppositely to and aligned with said dimples 47 in the rim of the spider. The knuckles or blocks 42 on the bolts at 26 have suitable U-shaped yokes 52 mounted on them by means of pins 53 that pass through the arms of the yokes and the bodies of the knuckles or blocks 42. Each yoke has a stud or arm 54 projecting from its cross member as shown in Fig. 4. The studs or arms 54 have cylindrical cross-section to enter the bores in the spherical members or balls 49 for sliding movement therein, thus providing universal joints or ball and socket connections between the spider and the louvers. The central portion 44 of the spider has a relatively thick ring 55 bolted to it that rests against a shoulder 56 at a reduced portion of the collar 30 and the said spider is maintained on this collar by a retainer nut 57. The clearance between the spider 43 and its mounting means permits it to rotate on the collar independently thereof and also independent of the housing section 19. This rotatable movement of the spider is such that it positions the louvers at predetermined angles whenever the pulley 40 has been manipulated by the operator, to regulate the direction and the quantity of the air delivered to the impeller blades.

When the housing section 21 is rotating, the impeller blades 38 thereon will draw an annular current of air through the mouth of the air passageway 17 in the tail portion of the fuselage and this air current is discharged to the flared opposite end of the annular opening so that it will be effective upon ambient air adjacent the tail of the fuselage for producing a torque in opposition to the torque which has been created by the main propeller 14 of the helicopter. To increase or diminish and thus control the direction and quantity of air passing through the annular opening 17 the louvers or blades 39 may be tilted to different angles thus predetermining the amount of lateral pressure exerted by the air current against the ambient air. The louvers 39 are preferably located in advance of the impeller section 21 to thus selectively and definitely determine the flow of air to the impeller. It also will be seen that the rotating blades of the impeller and the louvers are all shrouded by the walls of the fuselage and all hazard is eliminated.

While this invention has been described in detail in its present preferred form or embodiment, it will be apparent to persons skilled in the art, after understanding the improvements contemplated herein, that various changes and modifications may be made therein without departing from the spirit or scope thereof. It is aimed in the appended claims to cover all such changes and modifications.

I claim:

1. In combination with concentric walls defining an annular passageway; impeller means for driving an air current through said passageway; a plurality of louvers swingingly mounted in said passageway; rocker arms adapted to operate said louvers; a rotatable spider carried on an axial support, the rim of said spider having sockets adjacent said rocker arms; and balls seated in said sockets and each slidably engaged with a rocker arm, whereby the rotative movement of said spider is adapted to simultaneously rock said arms and to selectively position said louvers for predetermining the direction and quantity of air moved through said passageway.

2. A device of the kind described comprising a passageway of annular cross section, the outer limit of said passageway being defined by a cylindrical wall; hollow stationary housing means arranged axially within said cylindrical wall for defining the inner limit of said annular passageway; an axial flow for driving an air current through said passageway; a rotatable spider mounted coaxially in said housing with its rim adjacent the outer wall thereof, radially disposed rotatable spindles arranged with their inner ends projected into said housing in juxtaposition to the rim of said spider, and the outer ends of said spindles being journaled in said cylindrical wall; an annular series of adjustable louvers carried by said spindles in said passageway in advance of said impeller; rocker arms on the inner ends of said spindles projecting through sockets in the rim of said spider; spherical members movable in said sockets and having slidable engagement with said rocker arms; and means imparting rotary reciprocatory movement to at least one of said spindles, such movement being transmitted through said spider to said other spindles for effecting the simultaneous swinging of said louvers thereby to control the direction and the quantity of air driven through said annular passageway.

3. In combination with a hollow body having a walled passageway of annular cross section extending therethrough; means for creating and controlling a current of air through said annular passageway, said means comprising an impeller having an enlarged hub and an annular row of blades projecting radially therefrom across said passageway intermediate the ends thereof; an annular row of adjustable louvers arranged radially in said annular passageway between the walls thereof and in advance of said impeller; rotatable spindles extending across said passageway for supporting said louvers; rocker arms for rotating said spindles; a rotatable spider; and ball and socket assemblies operatively connecting said rocker arms and said spider, the balls of said assemblies being provided with means to slidably receive said rocker arms.

4. In combination with inner and outer concentric walls defining an air passageway of annular cross section; means for driving an air current through said annular passageway; an annular row of louvers extending radially across said passageway in advance of said air driving means; spindles for said louvers journaled in said concentric walls; rocker arms on said spindles within said inner walls; a spider rotatable on a fixed axis within said inner wall and having its rim adjacent said wall; and articulated connections between said arms and the rim of said spider, said articulated connections including balls seated in sockets on the rim of the spider, said balls having bores slidably receiving the rocker arms.

J. NALL CANDLER.

(References on following page)

REFERENCES CITED

The following references are of record in the file of this patent:

UNITED STATES PATENTS

| Number | Name | Date |
|---|---|---|
| Re. 20,668 | Seelig | Mar. 8, 1938 |
| 2,100,489 | Richardson | Nov. 30, 1937 |
| 2,235,260 | Kice | Mar. 18, 1941 |
| 2,337,861 | Adamtchik | Dec. 28, 1943 |
| 2,369,652 | Avery | Feb. 20, 1945 |
| 2,371,706 | Planiol | Mar. 20, 1945 |

FOREIGN PATENTS

| Number | Country | Date |
|---|---|---|
| 500,965 | Great Britain | Feb. 20, 1939 |